United States Patent

Bosses

[11] Patent Number: 5,690,711
[45] Date of Patent: Nov. 25, 1997

[54] VACUUM BAG WITH REINFORCEMENT PATCH

[75] Inventor: Mark D. Bosses, Montvale, N.J.

[73] Assignee: Home Care Industries, Inc., Clifton, N.J.

[21] Appl. No.: 579,912

[22] Filed: Dec. 28, 1995

[51] Int. Cl.$^6$ ................................................. B01D 29/27
[52] U.S. Cl. ............................. 55/380; 55/382; 55/DIG. 2
[58] Field of Search ........................... 55/381, 382, 380, 55/DIG. 2, 361, 364; 264/109, DIG. 75

[56] References Cited

U.S. PATENT DOCUMENTS

| | | | |
|---|---|---|---|
| 2,522,526 | 9/1950 | Manning | 264/109 |
| 3,452,520 | 7/1969 | Fesco | 55/382 |
| 4,240,813 | 12/1980 | Fesco | 55/DIG. 2 |
| 4,589,894 | 5/1986 | Gin et al. | 55/382 |
| 5,090,975 | 2/1992 | Requejo et al. | 55/381 |
| 5,181,946 | 1/1993 | Bosses et al. | 55/382 |
| 5,244,703 | 9/1993 | Bosses | 55/382 |

FOREIGN PATENT DOCUMENTS 2036591  7/1980  United Kingdom ............... 55/382

Primary Examiner—C. Scott Bushey
Attorney, Agent, or Firm—Amster, Rothstein & Ebenstein

[57] ABSTRACT

In a vacuum bag for a vacuum cleaner having a dirt-laden air outlet, the vacuum bag includes an air-permeable outer bag formed of paper, an air-permeable inner bag formed of meltblown material disposed within the outer bag, and an air-impermeable collar disposed on an outer surface of the outer bag. The inner bag, outer bag and collar define therethrough a channel of given area for passage therethrough of a dirt-laden air outlet into the inner bag. The improvement resides in the vacuum bag additionally including an air-impermeable reinforcement patch formed of flash-spun olefin material disposed opposite and at least partially below the channel when the vacuum bag is in use. Thus a portion of the outer bag generally opposite the outlet is protected from penetration and tearing by particles entrained in the dirt-laden air expelled at high speed from the outlet.

11 Claims, 3 Drawing Sheets

VACUUM BAG WITH REINFORCEMENT PATCH

BACKGROUND OF THE INVENTION

The present invention relates to a vacuum bag for a use in a vacuum cleaner, and more particularly to such a vacuum bag incorporating a reinforcement patch for enhanced longevity.

A vacuum cleaner typically includes a dirt-laden air inlet which is used to remove dirt from the environment and a dirt-laden air outlet which ejects the air picked up by the inlet into the interior of a vacuum bag. While vacuum bags were originally formed of a single ply—namely, an air-permeable bag formed of paper—more recently vacuum bags have been of a double ply nature—namely, the former air-permeable bag formed of paper as an outer bag and a new air-permeable bag formed of a meltblown material disposed within the outer bag as an inner bag. The inner bag is believed to enhance the ability of the vacuum bag to remove dirt from the dirt-laden air. In either case, an air-impermeable collar is disposed on an outer surface of the (outer) bag, the bag(s) and the collar define therethrough a channel of given area for passage therethrough and into the (inner) bag of a vacuum cleaner dirt-laden air outlet. The collar may or not incorporate a self-closing mechanism.

While the present invention may be used with either a one or two-ply bag (and indeed may be used with a three or greater ply bag as well), it will be described herein in the context of a modern two-ply bag. While the present invention may be used with any type of vacuum cleaner, it finds special utility in the industrial or commercial setting where the vacuum or suction developed by the vacuum cleaner is customarily substantially higher than that developed by a standard household vacuum cleaner, with the result that the dirt-laden air exits the outlet at high linear velocities.

The linear velocity with which the dirt-laden air will exit the dirt-laden air outlet will vary from one machine model to another to some degree, with the greatest differences being found between industrial or commercial vacuum cleaners and household vacuum cleaners. Thus the linear speed of the dirt-laden air (and the dirt entrained therein) will be about 20–200 CFM (cubic feet per minute) for a household cleaner and about 60–300 CFM for an industrial or commercial cleaner.

The dirt-laden air leaving the outlet tends to follow a somewhat arcuate or parabolic path determined primarily by the momentum with which it leaves the outlet. The momentum drives the air in a straight line. As the outlet is typically horizontal, the air might typically be expected to leave in a straight horizontal line. (The time interval between the particles leaving the outlet and impacting on the outer bag is quite brief, only about a fraction of a second, so that the falling component due to gravity is barely appreciable.) However, the trajectory of the air leaving the outlet is often at an angle to the horizontal due to the elbow curvatures, etc., traversed by the air within the cleaner before it leaves the outlet, and this has been found to impart typically a falling component.

As the inner and outer bags are formed of relatively fragile, easily punctured and easily torn materials, the impact of the dirt and dust particles can easily cause punctures and even tears through which the particles can escape. The precise extent to which the useful longevity of the vacuum bag is impaired will vary with the number and linear speed of the particles entering the vacuum bag and the strength of the vacuum bag itself. It will be appreciated, however, that as the strength of the vacuum bag is increased, the air-permeable nature thereof will tend to be diminished correspondingly.

The puncturing and tearing of the bags by the relatively high speed dust and dirt particles is especially pronounced when the vacuum bag in use is disposed in a hard or inflexible shell unit having a cage disposed about the bag in order to separate the bag outer surface from the inner surface of the hard shell unit. Except for where the cage actually contacts the bag, the bag outer surface is essentially without any support and thus especially susceptible to being punctured and torn. By way of contrast, where the vacuum bag is disposed in a soft or flexible shell, the bag which to some degree conforms to the outer surface of the vacuum bag, the soft shell provides additional support and strengthens the vacuum bag against puncture or tearing.

Accordingly, it is an object of the present invention to provide a vacuum bag of enhanced longevity.

Another object to provide such a vacuum bag affording a high level of resistance to penetration and tearing by dirt and other particles in dirt-laden air without unduly reducing the air-permeability of the overall vacuum bag.

A further object is to provide such a vacuum bag for a hard shell-and-cage vacuum cleaner bag, which is simple and inexpensive to manufacture and easy to use.

SUMMARY OF THE INVENTION

It has now been found that the above and related objects of the present invention are obtained in an improved vacuum bag for a vacuum cleaner having a dirt-laden air outlet. The vacuum bag conventionally comprises an air-permeable outer bag formed of paper, an air-permeable inner bag formed of meltblown material disposed within the outer bag, and an air-impermeable collar disposed on an outer surface of the outer bag. The inner bag, the outer bag and the collar define therethrough a channel of given area for passage therethrough of a dirt-laden air outlet into the inner bag. The improvement is characterized by the vacuum bag additionally including an air-impermeable reinforcement patch formed of flashspun olefin material disposed opposite and at least partially below the channel when the vacuum bag is in use. The patch thereby protects a portion of the outer bag generally opposite the outlet from penetration and tearing by particles entrained in the dirt-laden air expelled at high speed from the outlet.

In a preferred embodiment, the patch has a thickness of about 127–279 microns, an Elmendorf tear strength of 3.5 N (both MD and CD), and a work to break of 4.4 Nm (MD) and 5.2 Nm (CD) Preferably, the patch is adhered to an inner surface of the outer bag and disposed intermediate the inner and outer bags. The surface area of the patch is less than 20% of that of the outer bag, but greater than that of the channel.

In another embodiment, the vacuum bag comprises an air-permeable bag, and an air-impermeable collar disposed on an outer surface of the bag. The bag and the collar define therethrough a channel of given area for passage therethrough of a dirt-laden air outlet into the bag. The improvement is characterized by the vacuum bag additionally including an air-impermeable reinforcement patch formed of flashspun olefin material disposed opposite and at least partially below the channel when the vacuum bag is in use. The patch thereby protects a portion of the bag generally opposite the outlet from penetration and tearing by particles entrained in the dirt-laden air expelled at high speed from the outlet.

The improvement of the present invention finds particular utility wherein the vacuum bag is intended for use in or is present within a hard shell-and-cage vacuum cleaner, wherein a cage maintains the vacuum bag spaced from the shell.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
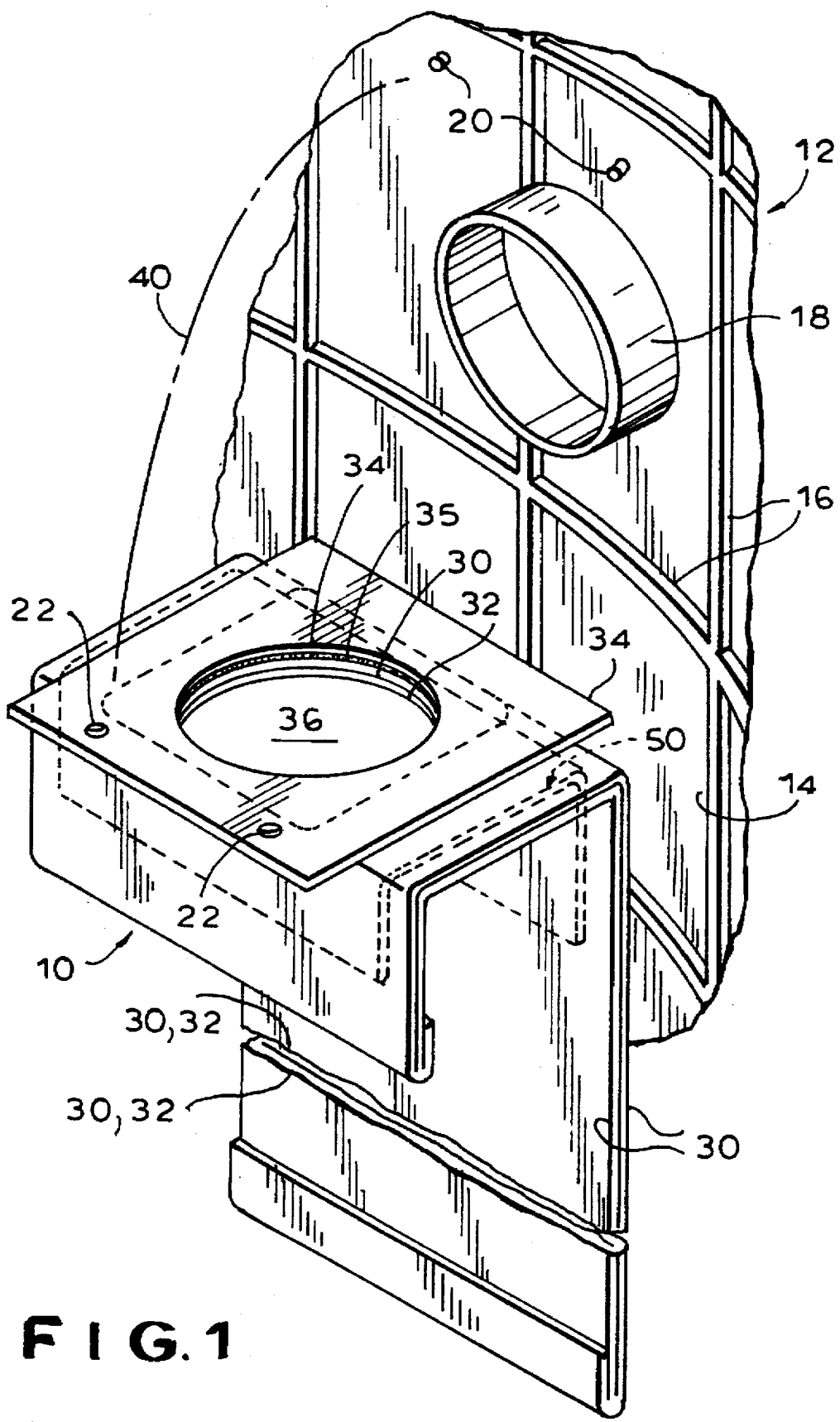
FIG. 1 is a fragmentary isometric view of a vacuum bag according to the present invention about to be mounted on the dirt-laden air outlet of a hard shell-and-cage type vacuum cleaner.

Referring now to the drawing, and in particular to FIG. 1 thereof, therein illustrated is a vacuum bag according to the present invention, generally designated by the reference numeral 10, in position to be mounted on a vacuum cleaner, generally designated 12.

Figure 2:
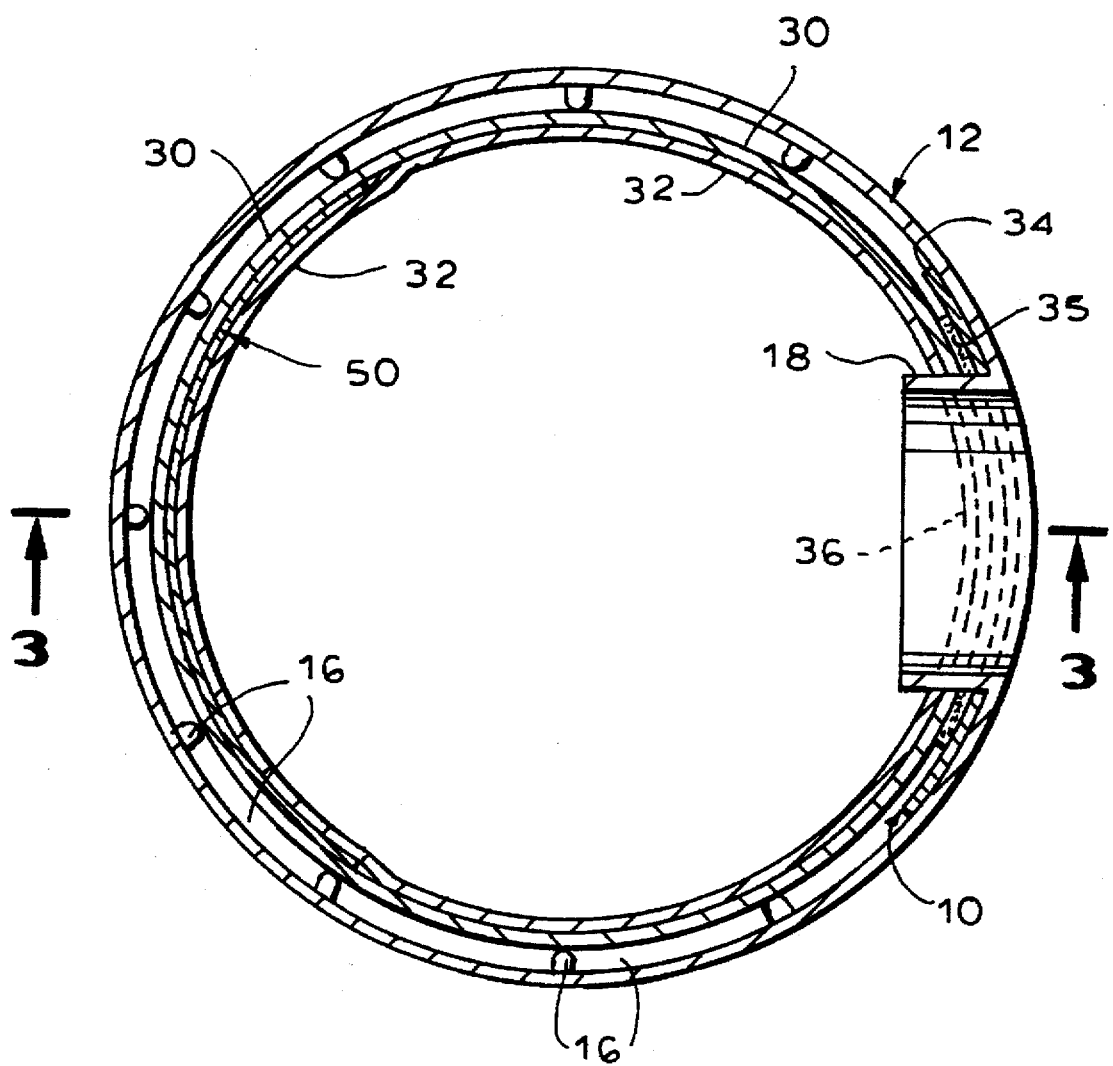
FIG. 2 is a sectional view of the vacuum cleaner with the vacuum bag mounted therein.

Referring now to FIG. 2 as well, the vacuum cleaner 12 is conventional in nature and is preferably, as illustrated, a hard shell-and-cage type of vacuum cleaner having a hard, general inflexible shell 14 and a cage 16 therewithin which functions to maintain the outer surface of the vacuum bag (except for the collar thereof) spaced inwardly from the inner surface of the shell 14. While the improvement described hereinafter finds a special utility when used in connection with a hard shell-and-cage type of vacuum cleaner, the vacuum bag 10 of the present invention may be employed with any of the conventional vacuum cleaners, whether hard shell or soft shell. The vacuum cleaner 12 defines a dirt-laden air inlet (not shown) typically disposed at the far end of a hose which is used to remove dirt from a surface and a dirt-laden air outlet 18 where the dirt-laden air is ejected into the vacuum cleaner, typically into the interior of the vacuum bag 10. Typically vacuum cleaner engaging means (such as the pins 20 projecting inwardly from the shell 14) may be provided for engagement with vacuum bag engaging means (such as complementary apertures 22 in the collar of bag 10).

Turning now to the vacuum bag 10, and referring in particular to FIGS. 1 and 2, in its conventional aspects the two-ply vacuum bag 10 comprises an air-permeable outer bag 30 formed of paper, an air-permeable inner bag 32 formed of meltblown material disposed within the outer bag 30, and an air-impermeable collar 34 disposed on an outer surface of the outer bag 30. The inner bag 32, the outer bag 30, and the collar 34 define therethrough a channel 36 of given area for passage therethrough of the dirt-laden air outlet 18 into the inner bag 32.

Typically the collar 34 is glued to the outer bag 30—e.g., by a hot melt or cold liquid adhesive 35. The periphery of the collar 34 substantially exceeds that of the outlet 18, the outlet 18 typically being cylindrical in plan while the collar 34 is rectangular in plan. As earlier noted, the collar 34 may include an engaging means, such as apertures 22, for cooperative engagement with engaging means on the shell 14, such as projecting pins 20. The collar 34 is typically inflexible, or at least resistant to flexure, in comparison with the remainder of the vacuum bag 10, which is typically relatively flexible.

The vacuum bag 10 may be of the manually closeable, automatically closeable or non-closeable varieties. In a manually closeable model, removal of the vacuum bag from the outlet does not automatically seal the channel 36; accordingly, separate measures must be taken to prevent leakage of dirt out of the vacuum bag through the channel. For example, an adhesive closure (not shown) may be provided for use by the operator once the bag 10 is removed from the vacuum cleaner outlet 18. In an automatically closeable model, the vacuum bag is provided with an apertured elastic member between the inner and outer bags 32, 30 and sometimes fingers to assist in the opening or closing of the aperture of the elastic member. For expository purposes, a non-closeable bag is illustrated. It will be appreciated, however, that the principles of the present invention apply equally to all models.

Figure 4:
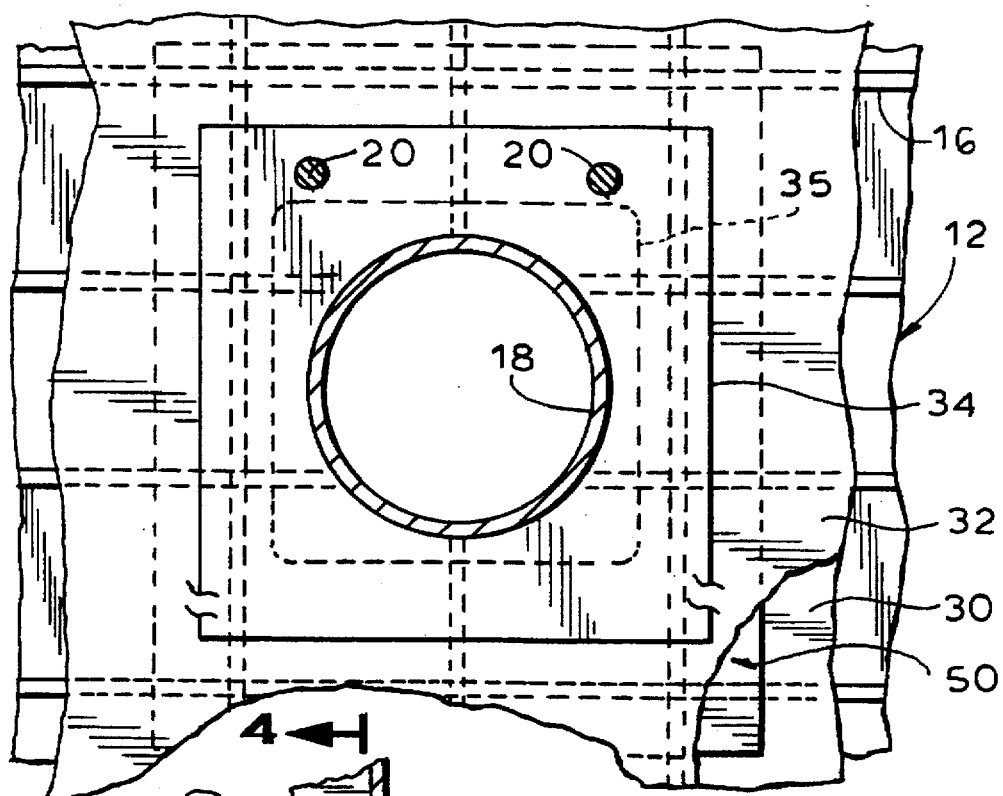
FIG. 4 is a sectional view taken along the line 4—4 of FIG. 3 with portions thereof removed to reveal details of internal construction.
Figure 3:
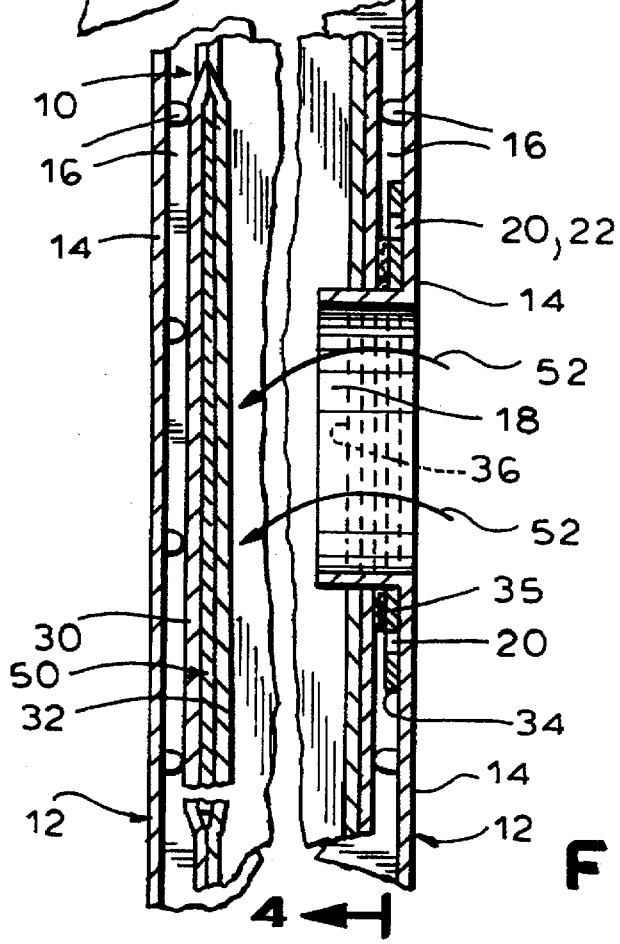
FIG. 3 is a fragmentary sectional view of the vacuum bag mounted on the outlet, taken along the line 3—3 of FIG. 2.

In order to position the vacuum bag 10 in the vacuum cleaner 12 for use, the vacuum bag 10 is unfolded in the direction of arrow 40 such that the collar 34 is closely adjacent the wall 14, with the channel 36 being occupied by the outlet 18 and the apertures 22 being occupied by the projecting pins 20, as illustrated in FIGS. 3 and 4.

In its novel aspects, the vacuum bag 10 according to the present invention additionally includes a reinforcement patch, generally designated 50, which is typically air-impermeable. While the patch 50 is preferably disposed intermediate the inner and outer bags 32, 30, it may alternatively be disposed on the inner surface of the inner bag 32 or the outer surface of the outer bag 30. The patch 50 is disposed opposite and at least partially below the channel 36 when the vacuum bag 10 is in use. The patch 50 may be round or circular in plan. It may extend symmetrically about the channel 36, but is preferably somewhat offset therefrom so that there is more of the patch 50 below the plane of the channel 36 than there is above the plane of the channel 36. The patch 50 extends appreciably below the channel 36 when the bag 10 is in use, so as to accommodate the typical downward or falling component of the particles emitted from the outlet 18.

In all instances the surface area of the patch in plan exceeds that channel 36 in plan preferably the surface area of the patch in plan is less than 20% of the surface area of the outer bag 30 in plan so as to minimize the overall decrease in air-permeability of the vacuum bag 10 due to the presence of the patch 50 therein.

The patch 50 is conveniently adhered to an inner surface of the outer bag 30, intermediate the inner and outer bags 32, 30. Typically the patch 50 does not adhere well to the meltblown material of the inner bag 32, even when glued thereto. Preferably the patch 50 is secured to the outer bag 30 by an adhesive such as a hotmelt (not shown).

The patch 50 protects the portion of the outer bag 30 generally opposite (and also slightly below) the outlet 18 from penetration and tearing by particles entrained in the dirt-laden air expelled at high speed from the outlet 18 (see arrows 52 of FIG. 3). To this end the patch 50 covers the entire portion of the outer bag 30 aligned with the channel 36 when the vacuum bag is in use as well as, preferably, at least a portion of the outer bag 30 downwardly displaced from the horizontal plane of channel 36.

The patch 50 is formed of flashspun olefin material, such as that available under the trade name TYVEK from Dupont. Type 10 TYVEK, Style 1079, is preferred and has a thickness of about 127–279 microns, an Elmendorf tear strength of 3.5 N (both Machine Direction and Cross Direction), and a work to break of 4.4 Nm (MD) and 5.2 Nm (CD). It also has a porosity of 87 seconds (Gurley Hill). Measurements were made by ASTM D 1777 (thickness), D 1424 (tear), D 1682 (1) (cut strip, work to break) and D 726-84 (porosity). The material in question is of the type commonly used for making envelopes for mailing purposes where a tear-resistant envelope is required.

It will be appreciated by those skilled in the art that the principles of the present invention are equally applicable to a single ply vacuum bag—that is, a vacuum bag 10 lacking the inner bag 32. In the single ply embodiment of a vacuum bag, the patch is disposed on either the inner or outer surface of the bag, opposite and at least partially below the channel when the vacuum bag is in use, thereby to protect a portion of the bag generally opposite the outlet from penetration and tearing.

To summarize, the present invention provides a vacuum bag of enhanced longevity, which affords a high level of resistance to penetration by dirt or other particles in dirt-laden air without unduly reducing the air-permeability of the overall vacuum bag. The bag is particularly useful in a hard shell-and-cage vacuum cleaner and is simple and inexpensive to manufacture and easy to use.

Now that the preferred embodiments of the present invention have been shown and described in detail, various modifications and improvements therein will become readily apparent to those skilled in the art. Accordingly, the spirit and scope of the present invention is to be construed broadly and limited only by the appended claims, and not by the foregoing specification.

I claim:

1. In a vacuum bag for a vacuum cleaner having a dirt-laden air outlet, said vacuum bag comprising:
   (A) an air-permeable outer bag formed of paper;
   (B) an air-permeable inner bag formed of meltblown thermoplastic polymeric material disposed within said outer bag; and
   (C) an air-impermeable collar disposed on an outer surface of said outer bag;
      said inner bag, said outer bag and said collar defining therethrough a channel of given area for passage therethrough of a dirt-laden air outlet into said inner bag;
      the improvement wherein said vacuum bag additionally includes:
   (D) an air-impermeable reinforcement patch; formed of flashspun polyolefin material disposed opposite and at least partially below said channel when said vacuum bag is in use;
      thereby to protect a portion of said outer bag generally opposite the outlet from penetration and tearing by particles entrained in the dirt-laden air expelled at high speed from the outlet.

2. The vacuum bag of claim 1 wherein said patch has a thickness of about 127–279 microns, an Elmendorf tear strength of 3.5 N (both MD and CD), and a work to break of 4.4 Nm (MD) and 5.2 Nm (CD).

3. The vacuum bag of claim 1 wherein said patch is disposed intermediate said inner and outer bags.

4. The vacuum bag of claim 1 wherein said patch is adhered to an inner surface of said outer bag.

5. The vacuum bag of claim 1 wherein the surface area of said patch is less than 20% of that of said outer bag but greater than that of said channel.

6. In a vacuum bag for a vacuum cleaner having a dirt-laden air outlet, said vacuum bag comprising:
   (A) an air-permeable outer bag formed of paper;
   (B) an air-permeable inner bag formed of meltblown thermoplastic polymeric material disposed within said outer bag; and
   (C) an air-impermeable collar disposed on an outer surface of said outer bag;
      said inner bag, said outer bag and said collar defining therethrough a channel of given area for passage therethrough of a dirt-laden air outlet into said inner bag;
      the improvement wherein said vacuum bag additionally includes:
   (D) an air-impermeable reinforcement patch formed of flashspun polyolefin material disposed intermediate said inner and outer bags opposite and at least partially below said channel when said vacuum bag is in use;
      said patch having a thickness of about 127–279 microns, an Elmendorf tear strength of 3.5 N (both MD and CD), and a work to break of 4.4 Nm (MD) and 5.2 Nm (CD);
      said patch being adhered to an inner surface of said outer bag, and the surface area of said patch being less than 20% of that of said outer bag but greater than that of said channel;
      thereby to protect a portion of said outer bag generally opposite the outlet from penetration and tearing by particles entrained in the dirt-laden air expelled at high speed from the outlet.

7. In a vacuum bag for a vacuum cleaner having a dirt-laden air outlet, said vacuum bag comprising:
   (A) an air-permeable bag; and
   (B) an air-impermeable collar disposed on an outer surface of said bag;
      said bag and said collar defining therethrough a channel of given area for passage therethrough of a dirt-laden air outlet into said bag;
      the improvement wherein said vacuum bag additionally includes
   (C) an air-impermeable reinforcement patch formed of flashspun polyolefin material disposed opposite and at least partially below said channel when said vacuum bag is in use;
      thereby to protect a portion of said bag generally opposite the outlet from penetration and tearing by particles entrained in the dirt-laden air expelled at high speed from the outlet.

8. The vacuum bag of claim 7 wherein said patch has a thickness of about 127–279 microns, an Elmendorf tear strength of 3.5 N (both MD and CD), and a work to break of 4.4 Nm (MD) and 5.2 Nm (CD).

9. The vacuum bag of claim 7 wherein said patch is adhered to an inner surface of said bag.

10. The vacuum bag of claim 7 wherein the surface area of said patch is less than 20% of that of said bag but greater than that of said channel.

11. In a vacuum bag for a vacuum cleaner having a dirt-laden air outlet, said vacuum bag comprising:
   (A) an air-permeable bag; and
   (B) an air-impermeable collar disposed on an outer surface of said bag;

said bag and said collar defining therethrough a channel of given area for passage therethrough of a dirt-laden air outlet into said bag;

the improvement wherein said vacuum bag additionally includes (C) an air-impermeable reinforcement patch formed of flashspun polyolefin material disposed opposite and at least partially below said channel when said vacuum bag is in use;

said patch having a thickness of about 127–279 microns, an Elmendorf tear strength of 3.5 N (both MD and CD), and a work to break of 4.4 Nm (MD) and 5.2 Nm (CD);

said patch being adhered to an inner surface of said bag, and the surface area of said patch being less than 20% of that of said bag but greater than that of said channel;

thereby to protect a portion of said bag generally opposite the outlet from penetration and tearing by particles entrained in the dirt-laden air expelled at high speed from the outlet.

* * * * *